United States Patent
Chuang et al.

(10) Patent No.: US 12,192,486 B2
(45) Date of Patent: Jan. 7, 2025

(54) VIDEO ENCODING PARALLELIZATION WITH TIME-INTERLEAVING CACHE ACCESS

(71) Applicant: MediaTek Inc., Hsinchu (TW)

(72) Inventors: Cheng-Yen Chuang, Hsinchu (TW); Chun-Chia Chen, Hsinchu (TW); Chih-Wei Hsu, Hsinchu (TW); Tzu-Der Chuang, Hsinchu (TW); Ching-Yeh Chen, Hsinchu (TW); Yu-Wen Huang, Hsinchu (TW)

(73) Assignee: MediaTek Inc. (TW)

( * ) Notice: Subject to any disclaimer, the term of this patent is extended or adjusted under 35 U.S.C. 154(b) by 129 days.

(21) Appl. No.: 17/978,530

(22) Filed: Nov. 1, 2022

(65) Prior Publication Data
US 2023/0199199 A1 Jun. 22, 2023

Related U.S. Application Data

(60) Provisional application No. 63/290,073, filed on Dec. 16, 2021.

(51) Int. Cl.
*H04N 19/176* (2014.01)
*H04N 19/119* (2014.01)

(52) U.S. Cl.
CPC ......... *H04N 19/176* (2014.11); *H04N 19/119* (2014.11)

(58) Field of Classification Search
CPC ..... H04N 19/176; H04N 19/119; H04N 19/43
See application file for complete search history.

(56) References Cited

U.S. PATENT DOCUMENTS

| | | | |
|---|---|---|---|
| 2005/0190976 A1* | 9/2005 | Todoroki | H04N 19/43 375/E7.101 |
| 2007/0153906 A1* | 7/2007 | Petrescu | H04N 19/61 375/240.26 |
| 2008/0147980 A1* | 6/2008 | Peters | G06F 12/0875 375/E7.102 |

(Continued)

FOREIGN PATENT DOCUMENTS

| | | |
|---|---|---|
| TW | I325697 B | 6/2010 |
| TW | 201813387 A | 4/2018 |

OTHER PUBLICATIONS

Taiwan Intellectual Property Office, Office Action for Taiwan Patent Application No. 111148485, Feb. 7, 2023.

*Primary Examiner* — Kyle M Lotfi
(74) *Attorney, Agent, or Firm* — Andy M. Han; Han IP PLLC (57) ABSTRACT

Various schemes pertaining to video coding parallelization techniques are described. An apparatus receives video data. The apparatus subsequently calculates a plurality of figures of merits (FOMs), each of the FOM representing how well a particular coding tool may perform in encoding the video data. The apparatus further determines a coding tool that may be suitable for encoding the video data by comparing the FOMs. In determining the coding tool, the apparatus utilizes time-interleaving techniques to parallelly process the video data. The video data may include an array of coding blocks, and the apparatus may receive the video data using a snake-like processing order scanning through the array of coding blocks.

18 Claims, 8 Drawing Sheets

(56) References Cited

U.S. PATENT DOCUMENTS

| | | | |
|---|---|---|---|
| 2010/0215105 A1* | 8/2010 | Nitta ................... | H04N 19/433 |
| | | | 375/E7.243 |
| 2022/0248041 A1* | 8/2022 | Satpathy .............. | H04N 19/182 |
| 2022/0256169 A1* | 8/2022 | Siddaramanna ..... | H04N 19/147 |

* cited by examiner

VIDEO ENCODING PARALLELIZATION WITH TIME-INTERLEAVING CACHE ACCESS

CROSS REFERENCE TO RELATED PATENT APPLICATION

The present disclosure is part of a non-provisional patent application claiming the priority benefit of U.S. Provisional Patent Application No. 63/290,073, filed on Dec. 16, 2021, the content of which is incorporated by reference in its entirety.

TECHNICAL FIELD

The present disclosure is generally related to video coding and, more particularly, to methods and apparatus for high-efficiency video encoding with parallelization techniques.

BACKGROUND

Unless otherwise indicated herein, approaches described in this section are not prior art to the claims listed below and are not admitted as prior art by inclusion in this section.

Video coding generally involves encoding a video (i.e., an original video) into a bitstream by an encoder, transmitting the bitstream to a decoder, and decoding the video from the bitstream by the decoder parsing and processing the bitstream to produce a reconstructed video. The encoder may employ various coding modes or tools in encoding the video, with a purpose, among others, of reducing a total size of the bitstream that needs to be transmitted to the decoder while still providing the decoder enough information about the original video such that a reconstructed video satisfactorily faithful to the original video can be generated by the decoder. For example, in the final version of the Versatile Video Coding (VVC) standard, a state-of-the-art video coding standard published in the year of 2020, various coding tools are newly defined therein to achieve a coding gain (e.g., a bitrate gain such as a Bjontegaard Delta-Rate gain) of around 40% as compared to the previous-generation video coding standard, i.e., the High Efficiency Video Coding (HEVC) standard, the norm of video coding since its publication in 2013. With the new coding tools provided by VVC, high-performance video coding is made possible supporting new video use cases such as viewport-dependent streaming of 360° video, with advanced features such as region-wise random access, signal-to-noise ratio (SNR) scalability, etc.

For instance, the VVC standard includes new coding tools related to intra-picture prediction, such as matrix-based intra prediction (MIP), chroma separate tree (CST), intra sub-partitioning (ISP), and intra block copy (IBC). New coding tools related to inter-picture prediction, such as adaptive motion vector resolution (AMVR), merge mode with motion vector difference (MMVD), combined inter/intra prediction (CIIP), and geometry partition (GPM) are also included in VVC. New tools applicable to both intra- and inter-picture predictions are also included in VVC, such as sampled adaptive offset (SAO), adaptive loop filter (ALF), cross component adaptive loop filter (CCALF), and joint coding of chromatic residuals (JCCR). Moreover, new tools pertinent to encoder block partitioning are also included in VVC, such as ternary tree partitioning (TT), binary tree ternary tree partitioning (BT_TT), a larger maximum coding tree unit size of 64 pixels by 64 pixels (CTU64), and a larger maximum transform unit size of 32 pixels by 32 pixels (TU32). Other newly developed video coding standards have also been following a similar trend of VVC to include a greater number of coding tools for achieving better coding performance.

It follows that the coding tools an encoder is required to operate with would depend on which video coding standard or standards the encoder is designed to support. As the video coding standards evolve over time, an increasingly greater number of coding tools are defined in the standards, and a versatile video encoder is thus expected to have the capability of realizing various kinds of coding tools. Therefore, it is of high importance that, for each picture or a portion thereof to be coded, the encoder is able to quickly determine a preferred or otherwise suitable coding tool or tools to be applied to the immediate video data to be coded so as to achieve desired video quality with reasonable coding cost.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to video encoding with parallelization techniques. It is believed that with the various embodiments in the present disclosure, benefits including improved coding latency, simplified search memory access, and/or reduced hardware overhead are achieved.

In one aspect, a method is presented for encoding video data with a preferred coding tool. The method may involve receiving, by a plurality of processing elements (PEs) each configured to perform coding efficiency evaluation for a respective coding tool, video data to be evaluated in performing the coding efficiency evaluation. In some embodiments, each of the PEs may be a low-complexity rate-distortion optimizer (LC-RDO). The method may subsequently involves calculating, by each of the plurality of PEs performing the coding efficiency evaluation, a respective figure of merit (FOM) specific to the respective coding tool and the video data. In some embodiments, the FOM may be a sum of squared differences (SSD), a sum of absolute differences (SAD), or a sum of absolute transformed differences (SATD). The method may further involve determining a coding tool specific to the video data by comparing the FOMs calculated by the plurality of PEs. In some embodiments, the method may also involve determining a set of parameter settings pertinent to the determined coding tool. Finally, the method may encode the video data using the determined coding tool and parameter settings.

In some embodiments, the video data may be a coding block (CB) which is divided into a plurality of sub-blocks that form an array of columns and rows. When receiving the video data, each PE may continuously receive several sub-blocks at one time. The number of sub-blocks received by each PE at one time may be the same as the number of PEs involved, i.e., same as the number of coding tools to be evaluated. In some embodiments, the PEs may receive and process the video data using a snake-scan processing order to process through the columns or the rows.

In some embodiments, the sub-blocks may be stored in a cache memory that has several memory banks. The memory banks may be divided into two groups, wherein each group may have as many memory banks as the number of PEs. In an event that the PEs receive the sub-blocks using a column-by-column snake or raster scan, any two adjacent columns of the sub-blocks are stored in the two groups of the memory banks, respectively. In an event that the PEs receive the sub-blocks using a row-by-row snake or raster scan, any two adjacent rows of the sub-blocks are to be stored in the two groups of the memory banks, respectively.

In another aspect, an apparatus is presented which comprises a cache memory, a processor, a plurality of processing elements (PEs), and a comparator. The processor is configured to store video data in the cache memory according to a bank assignment scheme specific to the video data, wherein the bank assignment scheme is determined by the processor based on various factors such as the size of the coding blocks of the video data, the size of the sub-blocks of the video data, the number of PEs concurrently operating in a time-interleaving manner, the scanning order (e.g., raster scan or snake scan) used to process through the sub-blocks of the video data, etc. Each of the PEs is configured to apply a respective coding mode or coding tool to the video data, and subsequently determine a coding efficiency thereof by calculating a figure of merits (FOM) such as a sum of squared differences (SSD), a sum of absolute differences (SAD), or a sum of absolute transformed differences (SATD). The comparator is configured to compare the FOMs calculated by the PEs and accordingly determine a coding tool.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Implementations in accordance with the present disclosure relate to various techniques, methods, schemes and/or solutions pertaining to efficient parallelized video encoding and search memory access. According to the present disclosure, a number of possible solutions may be implemented separately or jointly. That is, although these possible solutions may be described below separately, two or more of these possible solutions may be implemented in one combination or another.

I. Parallelized Coding Tool Evaluation

As described elsewhere herein above, it is important for an encoder (i.e., a video encoder) to quickly determine which coding tool is suitable for encoding the immediate video data. The encoder would thus use the determined coding tool, rather than other coding modes the encoder is also capable of performing, to encode the video data. The encoder may determine a certain coding tool to be the most suitable one depending on various factors, such as specific properties of the video to be coded, specific features intended for the encoded bitstream, etc. Moreover, different portions of the video data may be coded using different coding tools or modes. For example, each frame of the video may be divided into non-overlapping blocks, sometimes referred to as coding blocks (CBs), and each frame may be partitioned into multiple slices each having a correlative group of the non-overlapping blocks. The video data may be coded in a way that each slice (i.e., the coding blocks thereof) is coded with a corresponding one coding tool.

In order to determine a coding tool (i.e., the most suitable coding tool for encoding the immediate video data, or a slice thereof), the encoder may need to evaluate several candidate coding tools using at least a portion of the immediate video data to be coded. In order to determine the coding tool quickly, the evaluation process aims not at achieving a fine (i.e., highly accurate) coding result, but at obtaining a rough (i.e., not so accurate) result in a timely manner for each candidate coding tool being evaluated, so that the results can be compared, and the coding tool determined accordingly. The encoder would subsequently encode the immediate video data with the determined coding tool. The evaluation process is interchangeably referred to as "coding tool evaluation process" or "coding efficiency evaluation process" hereinafter.

It is worth noting that the determined coding tool is usually dependent on the video data to be coded. This is because a coding tool that is suitable for encoding a certain type of video data may not be equally suitable for encoding other types of video data. For instance, different coding tools may be respectively determined when encoding video data containing mostly natural images as opposed to encoding video data containing mostly screen content.

Figure 1:
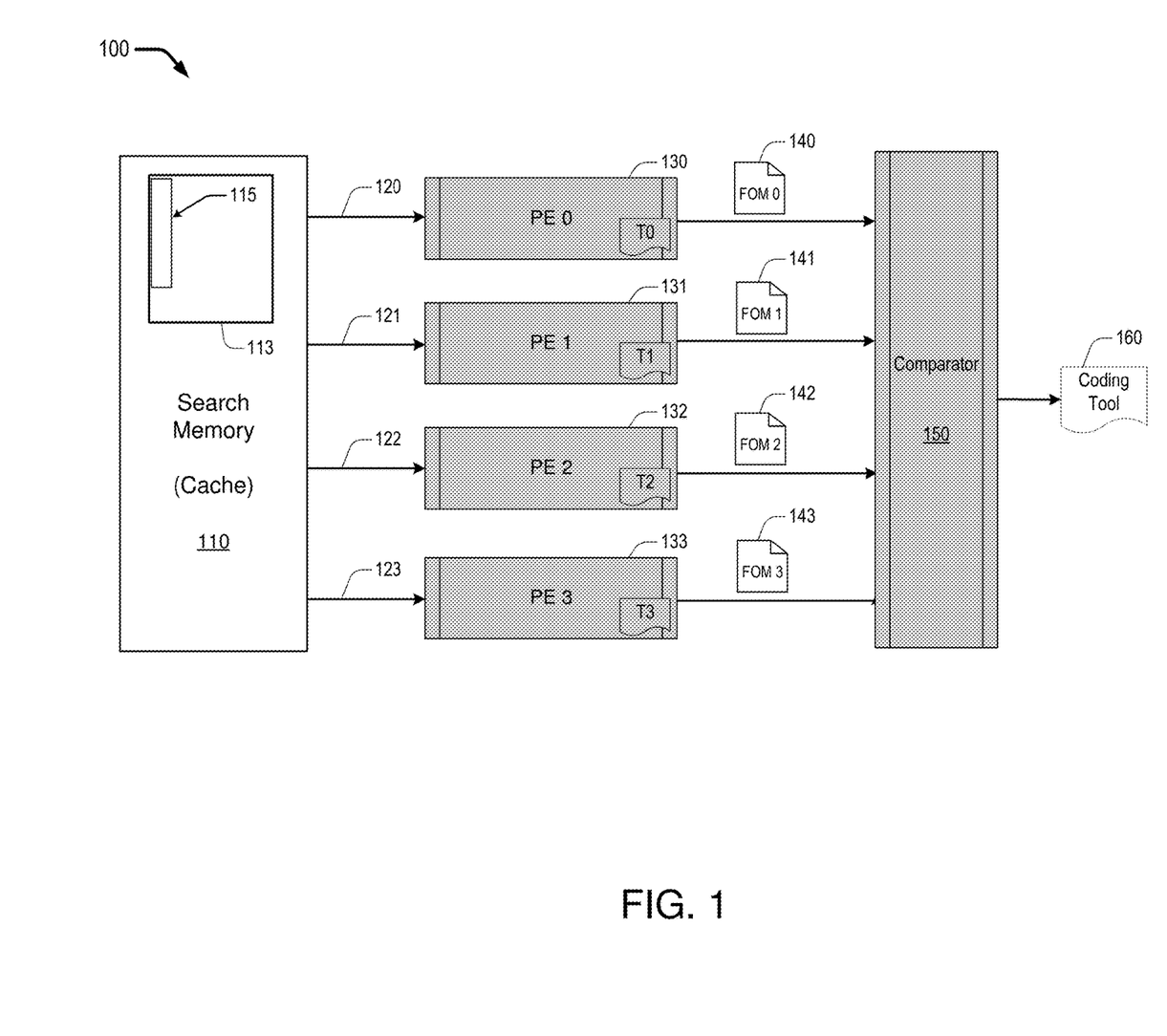
FIG. 1 is a diagram of an example design in accordance with an implementation of the present disclosure.

In order to evaluate several candidate coding tools in a timely manner, the encoder may employ parallelization for the evaluation process. Namely, two or more processing elements (PEs) are operating concurrently, with each PE evaluating the performance (e.g., coding efficiency) of a respective candidate coding tool. FIG. 1 is a diagram of an example design in accordance with an implementation of the present disclosure, wherein a parallelized coding tool evaluation scheme 100 is presented. In the scheme 100, parallelization is realized by four processing elements (PEs), i.e., PEs 130, 131, 132 and 133, which operate simultaneously. Each of the PEs 130-133 is configured to evaluate coding efficiency of a respective coding tool as applied on video data stored in search memory 110. For example, PE 130 is configured to perform coding efficiency evaluation for a coding tool T0, and PE 131 is configured to perform coding efficiency evaluation for a coding tool T1. Meanwhile, PE 132 and PE 133 are configured to perform coding efficiency evaluation for coding tools T2 and T3, respectively. Each of the coding tools T0, T1, T2 and T3 may be one of the coding tools defined in VVC, HEVC, or other video coding standards, such as the VVC coding tools described elsewhere herein above.

As described above, the PEs 130-133 are aimed to evaluate coding tool efficiency in a timely manner. Therefore, simple evaluation algorithms involving low-complexity hardware and/or software modules are often used for realizing the PEs. For example, each of the PEs 130-133 may be a low-complexity rate-distortion optimizer (LC-RDO), which is configured to evaluate coding efficiency of a coding tool by performing relatively simple calculations, e.g., spatial pixel filtering, absolute difference calculation between pixels, pixel-wise squared difference calculation, and pixel-by-pixel transformed difference calculation. Typically, each of the PEs 130-133 may have a pipeline structure or architecture, which includes multiple processing stages. The pipeline structure is configured to process data by sequentially passing data from one stage to the next stage. In some embodiments, the PEs 130-133 may incrementally fetch video data from the search memory 110 for processing. For example, each of the PEs 130-133 may be a LC-RDO having a pipeline structure that includes a horizontal filtering (HFIR) stage, which is followed by a vertical filtering (VFIR) stage, which is followed by a distortion calculation (DIST) stage, which is followed by a comparison (COMP) stage. The LC-RDO may process data incrementally using the pipeline stages, wherein each stage processes a different part of the data during each pipeline cycle.

Same video data, i.e., video data 113 stored in the search memory 110, is used by each of the PEs 130-133 to evaluate coding efficiency of the respective coding tool. In some embodiments, the video data 113 may include a coding block (CB) of a video. A coding tool 160, after it is determined in the scheme 100, is then used to encode the CB 113. The coding tool 160 is determined to be one of the coding tools T0, T1, T2 and T3. The coding tool 160 is determined by a comparator 150, which is configured to compare evaluation results generated by the PEs 130-133. Each of the PEs 130-133 may perform the coding efficiency evaluation by applying the respective coding tool on the video data 113, thereby generating an evaluation result. For example, the PE 130 may perform coding efficiency evaluation by applying the coding tool T0 on the video data 113, thereby generating an evaluation result manifested in a figure of merit (FOM) 140. Similarly, each of the PEs 131, 132 and 133 may perform coding efficiency evaluation by respectively applying the coding tools T1, T2 and T3 on the video data 113, thereby generating evaluation results manifested in FOMs 141, 142 and 143, respectively. In some embodiments, each of the FOMs 140-143 may be a sum of squared differences (SSD), a sum of absolute differences (SAD), or a sum of absolute transformed differences (SATD) between the resulted encoded video and the original video data 113, wherein the sum is calculated over every one of the pixels in the video data 113. The comparator 150 may compare the FOMs 140-143 and determine which one of the coding tools T0, T1, T2 and T3 is the coding tool 160 that is to be used for encoding the CB 113 later. For example, each of the FOMs 140-143 may be a respective SSD value, and the comparator 150 may compare the FOMs 140-143 and determine that the FOM 142 has the lowest value among the FOMs 140-143. Therefore, the comparator 150 may thereby decide that the coding tool T2 is the coding tool 160 to be used to encode the video data 113.

In some embodiments, in addition to the determined coding tool 160, the comparator 150 may also determine a set of coding parameters to be used with the determined coding tool 160 to encode the video data 113. To this end, some of the PEs 130-133 may be configured to operate with the same coding tool but with different coding parameter settings. For example, T0 and T1 may be the same coding tool, whereas the PEs 130 and 131 operate with different coding parameter settings applied to the same coding tool, e.g., a first set of coding parameters vs. a second set of coding parameters. The resulted FOMs 140 and 141 would indicate which set of the coding parameters is preferred between the first set and second set. The preferred set of coding parameters is included as part of the determined coding tool 160.

In some embodiments, the scheme 100 may involve a PE (e.g., the PE 130, 131, 132 or 133) that includes a high-complexity rate-distortion optimizer (HC-RDO) in place of, or in addition to, the LC-RDO of the PE. The HC-RDO may be concatenated with the LC-RDO of the PE. Compared with the implementations with a PE having only the LC-RDO, the PE having the HC-RDO can determine or otherwise calculate the respective FOM (i.e., the FOM 140, 141, 142 or 143) with a higher accuracy by involving more complicated computation, although generally at a cost of more processing time. Due to the higher accuracy, the coding tool 160 determined by PEs involving HC-RDOs may be different from the coding tool 160 determined by PEs involving only LC-RDOs and may be more suitable for coding the CB 113 with enhanced coding efficiency and/or performance.

II. Time-Interleaving Cache Access

The search memory 110 is sometimes referred as "cache" or "cache memory". The cache memory 110 is designed to be a temporary storage for storing video data, such as the CB 113, during the coding tool evaluation process, wherein the PEs 130-133 may repeatedly access the cache memory 110 for loading different portions of the CB 113. However, the cache memory 110 is not capable of providing simultaneous access to each of the PEs 130-133. Namely, even though the scheme 100 illustrates that the PEs 130-133 have access to the cache memory 110 via data buses 120, 121, 122 and 123, respectively, the property of the cache memory 110 described above mandates that, at any time, no more than one of the data buses 120-123 may be "on", i.e., transmitting data from the cache 110 to one of the PEs 130-133. It follows that true parallelization between the PEs 130-133 is possible only if the cache memory 110 is duplicated into multiple copies, with each copy being accessed by a corresponding one of the PEs 130-133. Apparently, duplicating the cache memory 110 is not an attractive solution for parallelization, as the hardware cost of the duplicated copies is high and may not be practical.

Figure 2:
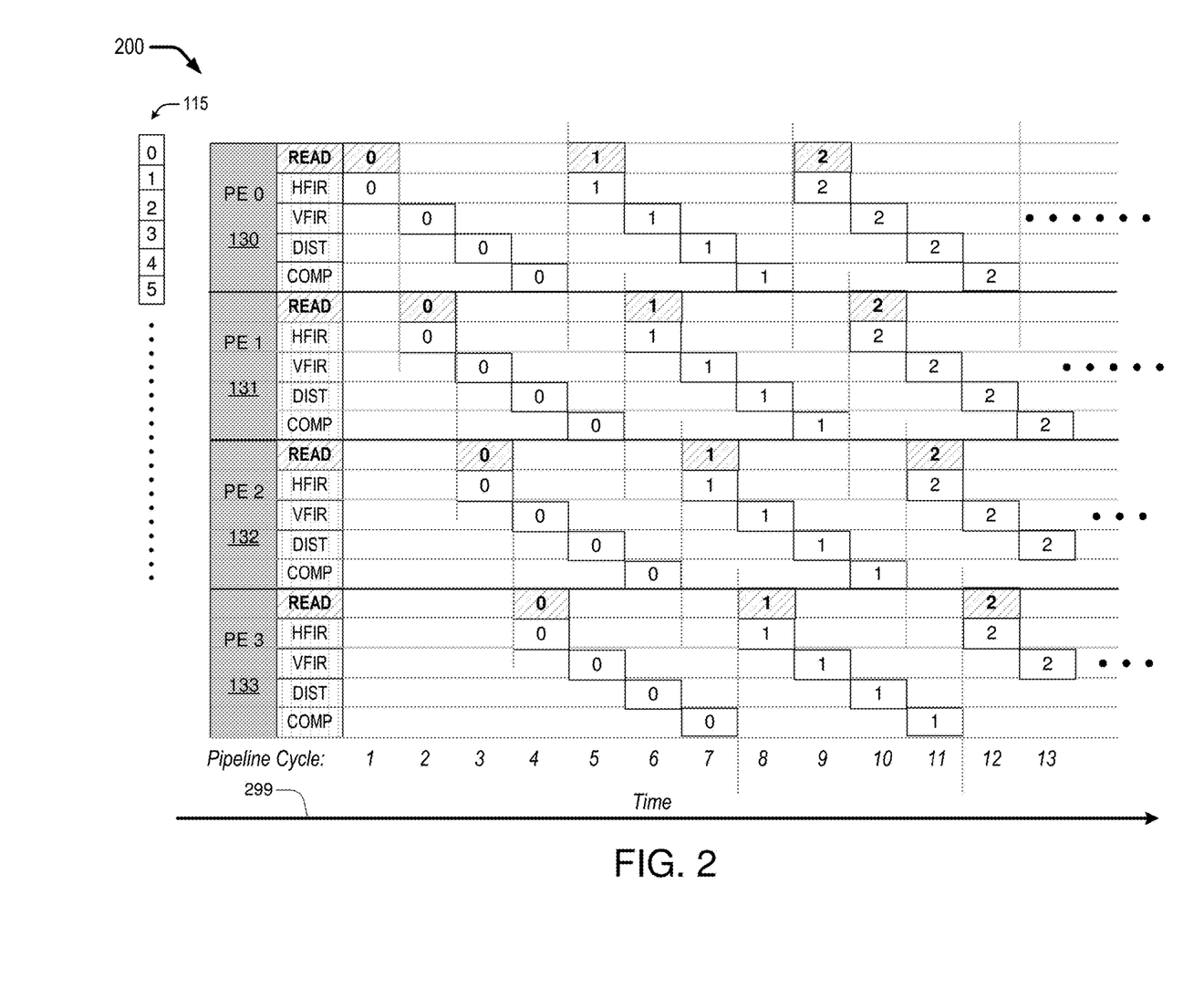
FIG. 2 is a diagram of an example design in accordance with an implementation of the present disclosure.

FIG. 2 is a diagram of an example design in accordance with an implementation of the present disclosure, wherein parallelization of practical meaning is realized without duplicating the cache memory 110. Specifically, FIG. 2 illustrates a time-interleaving cache access approach 200, wherein the PEs 130-133 may operate concurrently with no more than one of the data buses 120-123 turned on for accessing the cache memory 110 at any time. That is, at any given time, no more than one of the PEs 130-133 may receive data (e.g., the video data 113) from the cache memory 110.

The PEs 130-133 may not load or otherwise read in the entirety of the video data 113 from the cache 110 prior to starting the coding efficiency evaluation process. Instead, the PEs 130-133 may load only a portion of the video data 113, such as a portion 115 of the CB 113. The PEs 130-133 may not need to access the cache 110 to load more portions of the CB 113 until the portion 115 is processed. Each of the PEs 130-133 may have an internal storage, often referred to as "line buffer", to store the portion of the video data 113 that is currently being loaded. The PE may access the line buffer to retrieve the portion of the video data 113 for the coding tool evaluation process. The PE may use the line buffer to hold or otherwise store the portion of the video data 113 until the cache window opens again, at which time the next portion of the video data 113 is being loaded. The line buffer may then be replenished by the new portion of the video data 113 that is currently loaded.

In some embodiments, the CB 113 may be divided into multiple non-overlapping sub-blocks, typically of a same size (e.g., 4 pixels in height and 4 pixels in width). That is, the sub-blocks of the CB 113 may form an array of columns and rows of the CB 113. The portion 115 of the CB 113 may include multiple sub-blocks, e.g., sub-blocks labeled with "0", "1", "2", "3", "4", and "5" in FIG. 2. Moreover, as described elsewhere herein above, each of the PEs 130-133 may be a LC-RDO pipeline consisting of a HFIR stage, a VFIR stage, a DIST stage, and a COMP stage. Data may pass through the various stages of the LC-RDO pipeline by first being processed by the HFIR stage, followed by being processed by the VFIR stage, followed by being processed by the DIST stage, and finally being processed by the COMP stage. A timeline 299 is provided in FIG. 2 to indicate a progression of the first thirteen pipeline cycles, i.e., pipeline cycles 1-13.

As shown in FIG. 2, the PEs 130-133 access the cache 110 in a time-interleaving manner. For example, during the first pipeline cycle, it is the PE 130's turn to access the cache 110 (indicated by "READ" phase in the figure), during which the PE 130 loads the sub-block "0" of the CB 113. The PEs 131-133 loads the sub-block "0" of the CB 113 in the following three pipeline cycles, i.e., the second, the third, and the fourth pipeline cycles, respectively. After the sub-block "0" is sequentially loaded by the PEs 131-133, it is the PE 130's turn again to access the cache 110 in the fifth pipeline cycle, during which the PE 130 loads the next sub-block (i.e., the sub-block "1") of the CB 113. Likewise, the PEs 131-133 loads the sub-block "1" of the CB 113 in the following three pipeline cycles, i.e., the sixth, the seventh, and the eighth pipeline cycles, respectively. After the sub-block "1" is sequentially loaded by the PEs 131-133, it is the PE 130's turn again to access the cache 110 in the ninth pipeline cycle, during which the PE 130 loads the next sub-block (i.e., the sub-block "2") of the CB 113. The PEs 131-133 loads the sub-block "2" of the CB 113 in the following three pipeline cycles, i.e., the tenth, the eleventh, and the twelfth pipeline cycles, respectively.

As the access to the cache 110 by the PEs 130-133 is time-interleaving, so is the processing of the loaded sub-blocks within the PEs 130-133 due to the pipeline nature of the PEs. For example, the PE 130 finishes processing the sub-block "0" of the CB 113 (with the COMP stage of the PE 130 finishing processing the sub-block '0') by the end of the fourth pipeline cycle, whereas the PEs 131, 132 and 133 finish processing the sub-block "0" of the CB 113 by the end of the fifth, the sixth, and the seventh pipeline cycles, respectively.

According to the time-interleaving cache access approach 200, at any given time, at most only one of the PEs 130-133 is loading sub-block data from the cache 110. Therefore, the parallelization scheme 100, which utilizes only one copy of the cache memory 110, can be realized by employing the time-interleaving cache access approach 200. Nevertheless, the approach 200 leads to a very low PE utilization rate. As shown in FIG. 2, the PE pipeline stages are idle (i.e., not processing any data) for most of the pipeline cycles. With the parallelization of four PEs, the time-interleaving cache access approach 200 results in a PE utilization rate of around 25%. In an event that more than four PEs are involved in the parallelization scheme, the time-interleaving cache access approach 200 would result in an even lower PE utilization rate.

Figure 3:
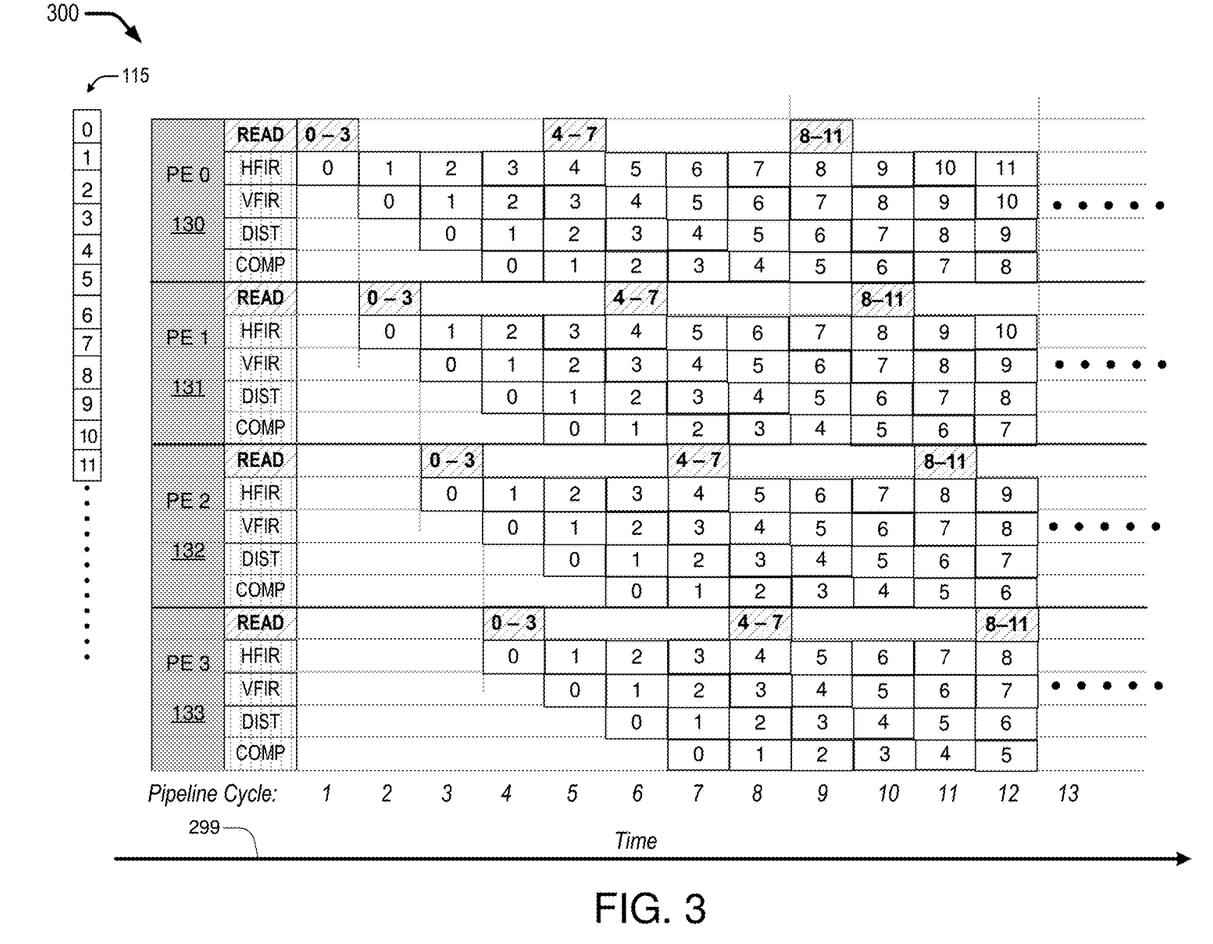
FIG. 3 is a diagram of an example design in accordance with an implementation of the present disclosure.

FIG. 3 is a diagram of an example design in accordance with an implementation of the present disclosure, wherein another time-interleaving cache access approach (i.e., an approach 300) is shown, which greatly improves the low PE utilization rate resulted from the approach 200. As shown in FIG. 3, the PE idle time is much less as compared with the approach 200. In fact, after many pipeline cycles, the approach 300 can result in a PE utilization rate of nearly 100%. Much of the PE idle time in the approach 200 is eliminated in the approach 300 by loading more than one sub-block of the CB 113 at each cache access window. For example, while the approach 200 commands the PE 130 to load only the sub-block "0" of the CB 113 from the cache 110 during the first pipeline cycle, the approach 300 advocates loading four sub-blocks, i.e., the sub-blocks "0", "1", "2" and "3" of the CB 113, during the first pipeline cycle. Given that the sub-blocks "1", "2" and "3" are loaded and saved to the line buffer of the PE 130 during the same pipeline cycle as the sub-block "0" is loaded (and saved), the onset of the PE 130 pipeline operation on the sub-blocks "1", "2" and "3" can be pulled in. For example, the PE 130 may start processing the sub-block "1" as early as the second pipeline period and finish the processing in the fifth pipeline cycle, pulling in by three pipeline cycles as compared to the approach 200. The completion of processing sub-block "2" by the PE 130 is pulled in even further, from the twelfth pipeline cycle as shown in FIG. 2 to the sixth pipeline cycle as shown in FIG. 3.

Specifically, according to the time-interleaving cache access approach 300, each of the PEs 130-133 receives the video data 113 in batches of sub-blocks, with each batch having multiple number of sub-blocks of the video data 113. In some embodiments, the number of the sub-blocks in each batch is equal to the number of PEs that operate in parallel in the coding efficiency evaluation process. For example, four PEs (i.e., the PEs 130-133) are used in parallel in the coding efficiency evaluation process of the parallelization scheme 100, so each of the four PEs is required to load a batch of four sub-blocks of the CB 113 (e.g., sub-blocks "0-3", sub-blocks "4-7", or sub-blocks "8-11") every time the time window is open for accessing the cache 110 as indicated in the time-interleaving cache access approach 300.

In some embodiments, the cache 110 may be divided into several "banks" (i.e., memory banks). The number of banks of a cache is an important parameter of the cache, as the number of banks represents the number of data entries that can be simultaneously read from or written to the cache. Specifically, at any time, at most only one data entry may be read from or written to a memory bank. Given that each of the PEs 130-133 is expected to receive four sub-blocks of the CB 113 in one pipeline cycle, the cache 110 is thus required to have at least four memory banks, wherein the four sub-blocks to be received in a batch during the one pipeline cycle are respectively stored in four separate memory banks. As described elsewhere herein below, considerations such as the number of memory banks the cache 110 must at least have, as well as which of the sub-blocks of the video data 113 are stored in which memory banks, are important design parameters in the realization of the parallelized coding tool evaluation scheme 100 with the time-interleaving cache access approach 300.

III. Sub-Block Scanning Order

Figure 4:
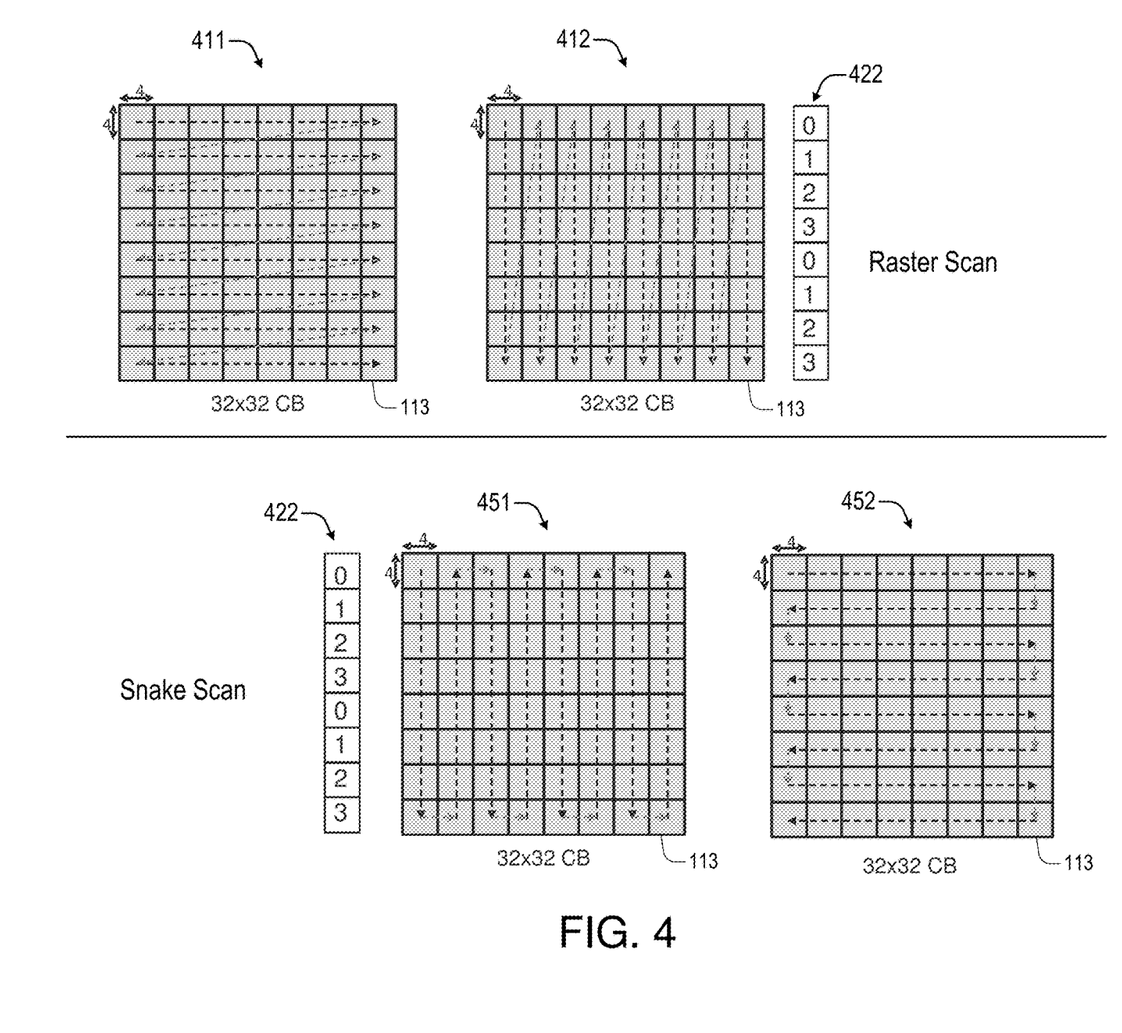
FIG. 4 is a diagram of an example design in accordance with an implementation of the present disclosure.

As described elsewhere herein above, a coding block may be divided into multiple sub-blocks such that the sub-blocks form an array of columns and rows of the coding block. FIG. 4 is a diagram of an example design in accordance with an implementation of the present disclosure, wherein the CB 113 is divided into non-overlapping sub-blocks that form an array of columns and rows. Specifically, the CB 113 as shown in FIG. 4 has a size of 32 pixels in width and 32 pixels in height, whereas the size of each sub-block is 4 pixels by 4 pixels. Therefore, the CB 113 is divided into 64 sub-blocks, as shown in each of diagrams 411, 412, 451 and 452.

According to the time-interleaving cache access approach 300, each of the PEs 130-133 is designed to load or otherwise receive the sub-blocks of the CB 113 in batches, with each batch containing four successive sub-blocks of the CB 113. FIG. 4 illustrates two types of scanning orders with which the PEs 130-133 may receive the sub-blocks of the CB 113. Specifically, the PEs 130-133 may receive the sub-blocks of the CB 113 using either a scanning order called "raster scan", as shown in the diagrams 411 and 412, or a scanning order called "snake scan", as shown in the diagrams 451 and 452. The raster scan can be performed in either a column-by-column fashion or a row-by-row fashion. The row-by-row fashion is illustrated in the diagram 411, wherein the PEs 130-133 loads the sub-blocks in the first row of the CB 113 from left to right, followed by loading the second row of the CB 113, also from left to right, and so on. The column-by-column fashion is illustrated in the diagram 412, wherein the PEs 130-133 loads the sub-blocks in the first column of the CB 113 from top to bottom, followed by loading the second column of the CB 113, also from top to bottom, and so on.

Likewise, the snake scan can also be performed in either a column-by-column fashion or a row-by-row fashion. In the snake scan, the scanning direction is alternated each row or column. The column-by-column snake scan is illustrated in the diagram 451, wherein the PEs 130-133 loads the sub-blocks in the first column of the CB 113 from top to bottom, followed by loading the second column of the CB 113 from bottom to top, followed by loading the third column of the CB 113 from top to bottom again, and so on. The row-by-row snake scan is illustrated in the diagram 452, wherein the PEs 130-133 loads the sub-blocks in the first row of the CB 113 from left to right, followed by loading the second row of the CB 113 from right to left, followed by loading the third row of the CB 113 from left to right again, and so on.

As described elsewhere herein above, each of the PEs 130-133 is required to load a batch of four sub-blocks at a time (i.e., during a pipeline cycle) according to the time-interleaving cache access approach 300. For the CB 113 as shown in FIG. 4, each column or row can be loaded in exactly two batches, and thus there is no cross-column or cross-row scenario when loading any batch of four sub-blocks, regardless of whether the raster scan or the snake scan is used. That is, there is not a case wherein two of the four sub-blocks in a batch fetched during a pipeline cycle are located in two adjacent columns or rows of the CB 113.

The corresponding cache bank assignment for the sub-blocks of FIG. 4 can also be easily determined. For example, a cache bank assignment 422 can be used for both the raster scan of diagram 412 and the snake scan of diagram 451. As indicated by the cache bank assignment 422, the cache 110 is required to have four memory banks, i.e., banks "0", "1", "2", "3" as shown in the cache bank assignment 422. The sub-blocks of the CB 113 are stored in the cache 110 according to the cache bank assignment 422. Namely, the first and the fifth sub-blocks of each column are stored in the bank "0"; the second and the sixth sub-blocks of each column are stored in the bank "1"; the third and the seventh sub-blocks of each column are stored in the bank "3"; finally, the fourth and the eighth sub-blocks of each column are stored in the bank "4".

However, for a coding block having a larger or smaller number of sub-blocks in a row or a column, or for a different number of PEs parallelly involved in the parallelized coding tool evaluation scheme 100, a cross-column or cross-row situation may be unavoidable, and the corresponding cache bank assignment would become more complicated. For these cases, the snake scan processing order is preferred over the raster scan processing order because the corresponding cache bank assignment is relatively simpler for the snake scan as opposed to the raster scan. A corresponding cache bank assignment for the raster scan processing order may be difficult to find or determine, as the cross-column or cross-row address difference may be very different depending on the size of the coding block being used. On the contrary, the snake scan processing order has a limited address difference when facing the cross-column or cross-row scenario.

Figure 5:
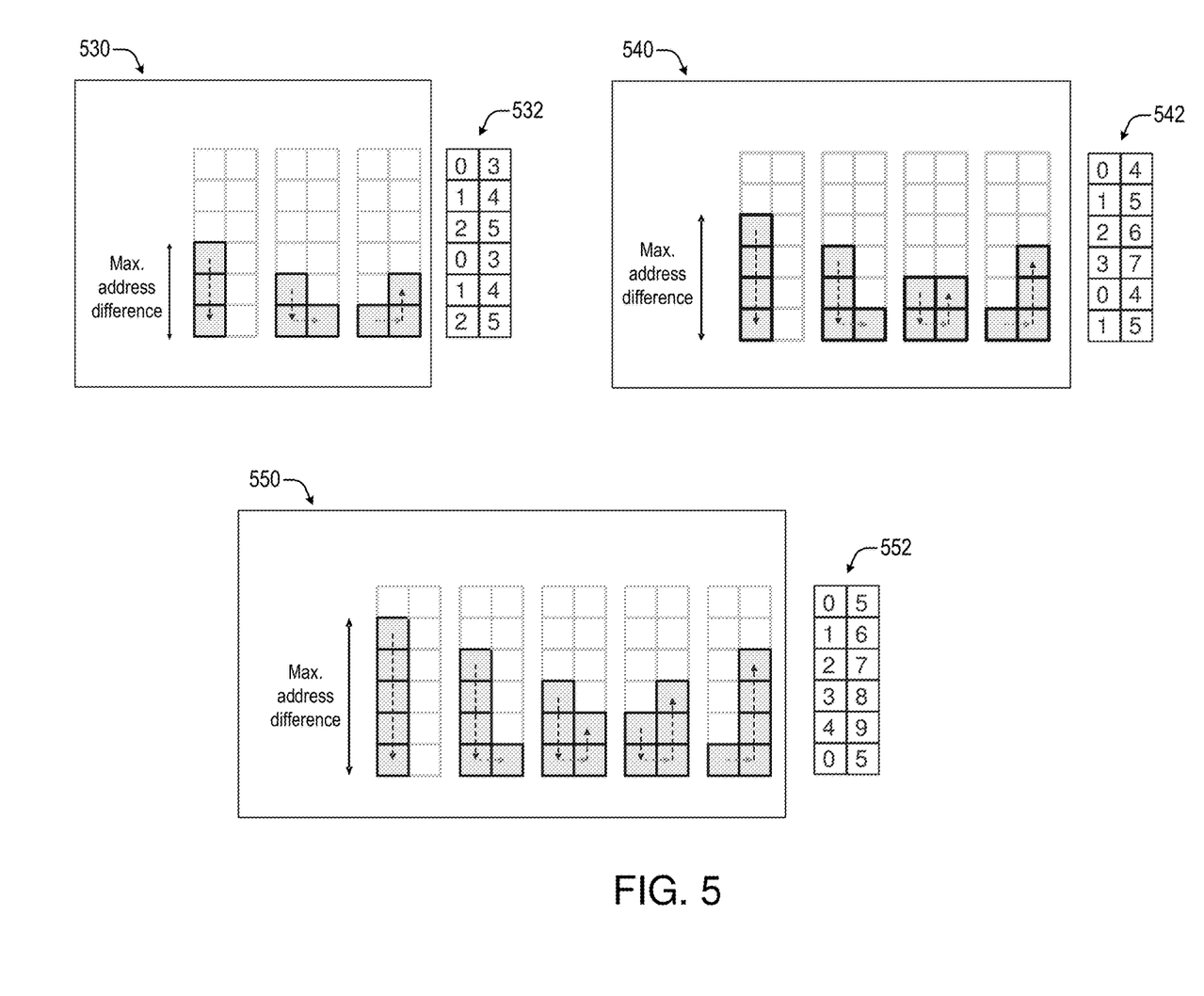
FIG. 5 is a diagram of an example design in accordance with an implementation of the present disclosure.

FIG. 5 is a diagram of an example design in accordance with an implementation of the present disclosure, wherein possible cross-column snake scan scenarios are illustrated, regardless of the size of the CB 113. Specifically, diagram 540 illustrates all four possibilities of cross-column scenarios when four PEs are involved in the parallelized coding tool evaluation scheme 100. As shown in the diagram 540, the maximum address difference among the four possibilities equals to four times the height of a sub-block. Similarly, diagram 530 illustrates all three possibilities of cross-column scenarios when three PEs are involved in the parallelized coding tool evaluation scheme 100; the maximum address difference among the three possibilities equals to three times the height of a sub-block. Likewise, diagram 550 illustrates all five possibilities of cross-column scenarios when five PEs are involved in the parallelized coding tool evaluation scheme 100; the maximum address difference among the five possibilities equals to five times the height of a sub-block.

Also shown in FIG. 5 are the corresponding bank assignments, i.e., bank assignments 532, 542 and 552 of the cache 110, for the scenarios shown in the diagrams 530, 540 and 550, respectively. The memory banks of the cache 110 may be divided into two groups, wherein each group may have as many memory banks as the number of PEs. For example, in the bank assignment 542, the cache 110 has two groups of four memory banks, the first group consisting of banks "0", "1", "2" and "3", the second group consisting of banks "4", "5", "6" and "7". The banks in the first group are repeatedly assigned to the sub-blocks of each of the odd-numbered columns (i.e., the first, third, fifth, seventh, ninth and eleventh columns, etc.), from top to bottom, whereas the banks in the second group are repeatedly assigned to the sub-blocks of each of the even-numbered columns (i.e., the second, fourth, sixth, eighth, tenth and twelfth columns, etc.), also from top to bottom. Consequently, any two adjacent columns of the sub-blocks are stored in the two groups of the memory banks, respectively. As another example, in the bank assignment 552, the cache 110 has two groups of five memory banks, the first group consisting of banks "0", "1", "2", "3" and "4", the second group consisting of banks "5", "6", "7", "8" and "9". The banks in the first group are repeatedly assigned to the sub-blocks of each of the odd-numbered columns, from top to bottom, whereas the banks in the second group are repeatedly assigned to the sub-blocks of each of the even-numbered columns, also from top to bottom. Consequently, any two adjacent columns of the sub-blocks are stored in the two groups of the memory banks, respectively.

IV. Illustrative Implementations

Figure 6:
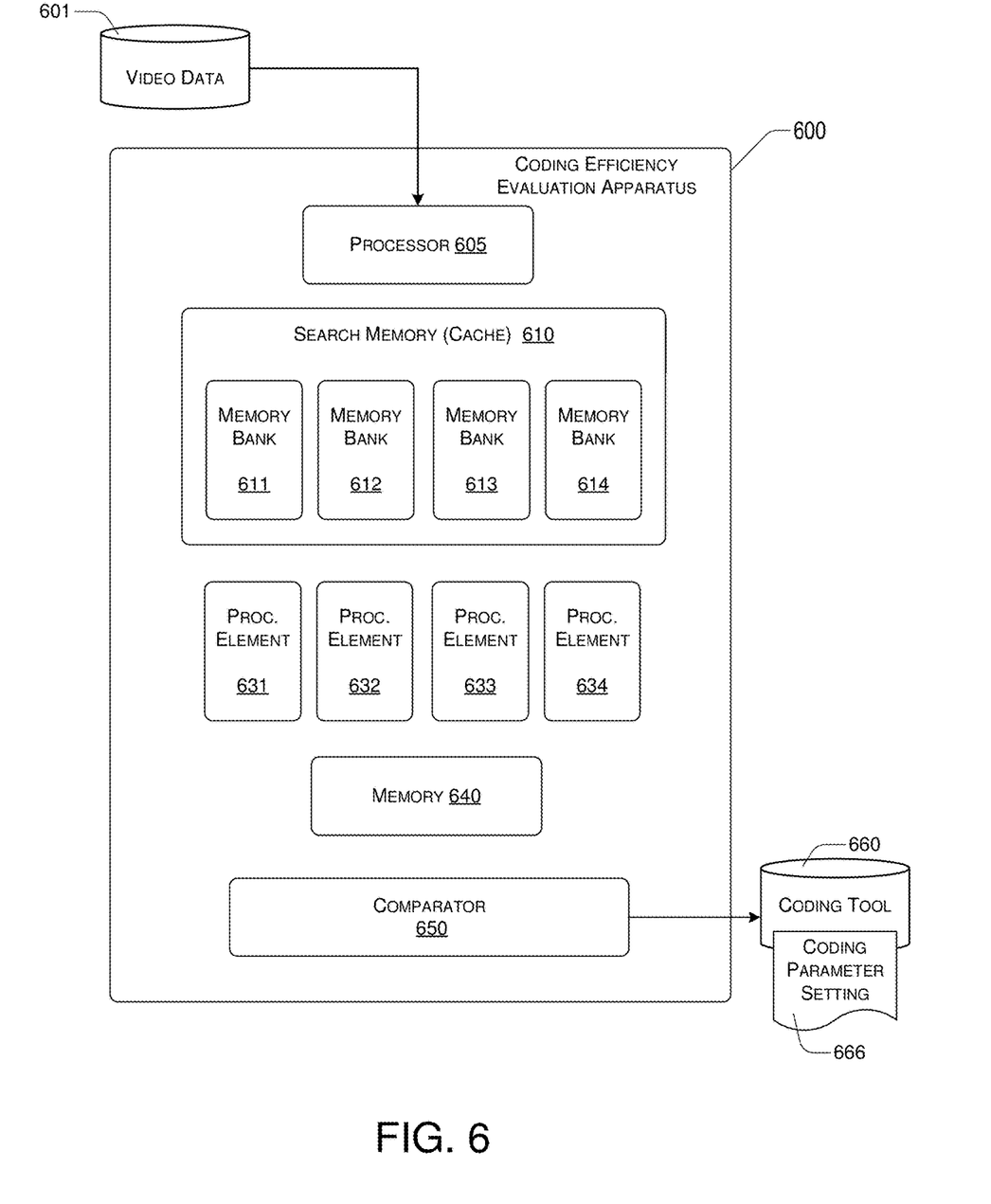
FIG. 6 is a diagram of an example coding efficiency evaluation apparatus in accordance with an implementation of the present disclosure.

FIG. 6 illustrates an example apparatus 600 capable of evaluating coding efficiency of multiple coding tools using the parallelization approach described above. As illustrated, the apparatus 600 receives video data 601 with which the coding tools are evaluated, and accordingly determines a coding tool 660 suitable for encoding the video data 601. In some embodiments, the apparatus 600 may also determine a setting 666 of coding parameters that is to be used with the determined coding tool 660. The video data 601 may include the coding block 113, whereas the determined coding tool 660 may be an embodiment of the coding tool 160. The apparatus 600 may be used to realize the parallelized coding tool evaluation scheme 100 using the time-interleaving cache access approach 200 or 300.

As illustrated, the apparatus 600 has several components or modules for processing the video data 601 and determining the coding tool 660, at least including some components selected from a processor 605, search memory or cache 610, a plurality of processing elements such as PEs 631-634, memory 640, and a comparator 650. The cache 610 may include several memory banks such as memory banks 611-614, each of the memory banks 611-614 capable of providing a respective data entry concurrently with rest of the memory banks 611-614.

In some embodiments, the modules 605-650 as listed above are modules of software instructions being executed by one or more processing units (e.g., a processor) of a computing device or electronic apparatus. In some embodiments, the modules 605-650 are modules of hardware circuits implemented by one or more integrated circuits (ICs) of an electronic apparatus. Though the modules 605-650 are illustrated as being separate modules, some of the modules can be combined into a single module.

The processor 605 is configured to receive and analyze the video data 601, thereby determining a memory bank assignment (e.g., the memory bank assignment 422, 532, 542 or 552). Namely, the memory bank assignment is specific to the video data 601. The processor 605 is also configured to store the sub-blocks of the video data 601 in the search memory 610 according to the memory bank assignment as determined.

The cache 610 may include multiple memory banks, such as the memory banks 611, 612, 613 and 614. The number of memory banks may be consistent with (e.g., equal to) the number of banks indicated in the memory bank assignment, which is determined by the processor 605. The number of memory banks of the cache 610 may be more than the four memory banks shown in FIG. 6. For example, the memory bank assignment 542 indicates ten different memory banks to be used for the snake scan. The processor 605 may accordingly store the video data 601 in ten different memory banks of the cache 610. The cache 610 may embody the search memory 110.

Each of the processing elements 631-634 may be an embodiment of one of the PEs 130-133. In some embodiments, each of the processing elements 631-634 may be a low-complexity RDO pipeline. In some embodiments, each of the processing elements 631-634 may additionally or alternatively include a high-complexity RDO. The processing elements 631-634 may be configured to fetch a portion of the video data 601 by accessing the cache 610 in a time-interleaving manner (e.g., following the time-interleaving approach 200 or 300). The portion of the video data 601 fetched at one time may comprise a plurality of sub-blocks of the video data 601 (e.g., sub-blocks 0-3, 4-7, or 8-11 of the portion 115 of the CB 113). In some embodiments, each of the processing elements 631-634 may include a line buffer, which is configured to temporarily store the sub-blocks fetched from the cache 610 in a batch until all of the sub-blocks of the batch are processed through the pipeline stages of the respective processing element.

Each of the processing elements 631-634 may be further configured to calculate a respective figure of merit (FOM) (e.g., the FOM 140, 141, 142 or 143) that indicates the coding efficiency of a respective coding tool as applied to the video data 601. Hence, the FOM is specific to a respective coding tool and the video data 601. That is, the FOM is specific to a combination of the respective coding tool and the video data 601. The FOM may be a sum of squared differences, a sum of absolute differences, or a sum of absolute transformed differences. The FOMs calculated by the processing elements 631-634 may be stored in the memory 640 and used as the input of the comparator 650. In some embodiments, the processing elements 631-634 may also store the coding parameters used for calculating the FOMs. In some embodiments, each of the PEs 631-634 may calculate multiple FOMs for the video data 601 using a same coding tool but with different coding parameter settings. Namely, in these embodiments, each calculated FOM is specific to a combination of the respective coding tool, the respective coding parameter, and the video data 601. Each of the FOMs and the corresponding coding parameters settings may both be saved in the memory 640.

The comparator 650 may be an embodiment of the comparator 150 and configured to determine the coding tool 660 by comparing the FOMs calculated by the processing elements 631-634 and stored in the memory 640. The comparison by the comparator 650 may determine a preferred FOM. For example, the preferred FOM may be a SAD having a lowest value. Accordingly, the coding tool resulted in the lowest value of SAD may be determined to be the coding tool 660. In some embodiments, the comparator 650 may also determine a parameter setting 666, which may be the parameter setting used by the processing elements 631-634 that results in the preferred FOM (e.g., having the lowest value of SAD).

V. Illustrative Processes

Figure 7:
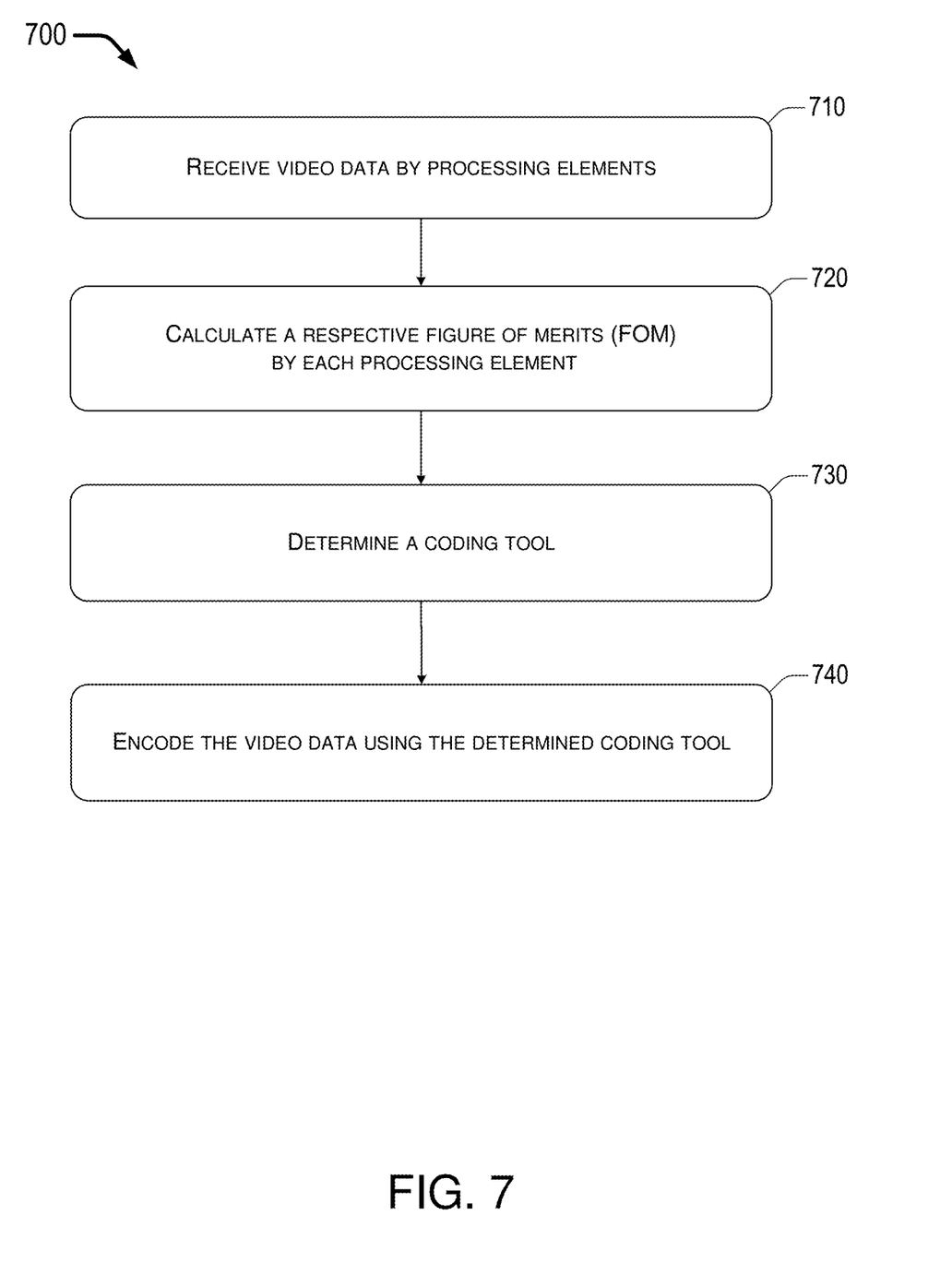
FIG. 7 is a flowchart of an example process in accordance with an implementation of the present disclosure.

FIG. 7 illustrates an example process 700 in accordance with an implementation of the present disclosure. Process 700 may represent an aspect of implementing various proposed designs, concepts, schemes, systems and methods described above. More specifically, process 700 may represent an aspect of the proposed concepts and schemes pertaining to determining a coding tool among a plurality of coding tools in accordance with the present disclosure. Process 700 may include one or more operations, actions, or functions as illustrated by one or more of blocks 710, 720, 730 and 740. Although illustrated as discrete blocks, various blocks of process 700 may be divided into additional blocks, combined into fewer blocks, or eliminated, depending on the desired implementation. Moreover, the blocks/sub-blocks of process 700 may be executed in the order shown in FIG. 7 or, alternatively in a different order. Furthermore, one or more of the blocks/sub-blocks of process 700 may be executed repeatedly or iteratively. Process 700 may be implemented by or in the apparatus 600 as well as any variations thereof. Solely for illustrative purposes and without limiting the scope, process 700 are described below in the context of the apparatus 600. Process 700 may begin at block 710.

At 710, process 700 may involve each of the processing elements of the apparatus 600 (e.g., the PEs 631-634) receiving video data to be evaluated in performing the coding efficiency evaluation (e.g., video data 113 or 601). Each of the processing elements is configured to perform coding efficiency evaluation for a respective coding tool (e.g., coding tool T0, T1, T2 or T3 of FIG. 1). In some embodiments, the PEs of the apparatus 600 receive the video data 601 by accessing the cache 610 in a time-interleaving manner. That is, at any time, no more than one of the PEs of the apparatus 600 may access the cache 610. In some embodiments, the video data 601 may include a coding block (CB), which may be divided into a plurality of sub-blocks forming an array of columns or rows. The PEs of the apparatus 600 may receive the CB in batches of sub-blocks, with each batch having a plurality of sub-blocks. In some embodiments, the number of sub-blocks in a batch is equal to the number of the PEs of the apparatus 600 that are concurrently operating. In some embodiments, the sub-blocks of the video data 601 may be fetched by the PEs of the apparatus 600 using a snake scan through the columns or rows of the sub-blocks of the video data 601. Process 700 may proceed from 710 to 720.

At 720, process 700 may involve each of the PEs of the apparatus 600 calculating a respective FOM. In some embodiments, each of the PEs may be a LC-RDO, and the respective FOM may be a sum of squared differences (SSD), a sum of absolute differences (SAD), or a sum of absolute transformed differences (SATD). The FOMs calculated by the PEs of the apparatus 600 may be stored in the memory 640. In some embodiments, the coding parameters used to calculate the FOMs may also be stored in the memory 640. Process 700 may proceed from 720 to 730.

At 730, process 700 may involve the comparator 650 comparing the FOMs stored in the memory 640 and accordingly determining a coding tool 660, which is specific to the video data 601. In some embodiments, the comparator 650 may determine the coding parameter setting that is used with the determined coding tool 660 to be the parameter setting 666. The determined parameter setting 666 may be a set of settings comprising values of a number of coding parameters. Process 700 may proceed from 730 to 740.

At 740, process 700 may involve the processor 605 encoding the video data 601 using the determined coding tool 660. In some embodiments, the processor 605 may encode the video data 601 using the determined coding tool 660 with the determined parameter setting 666.

VI. Illustrative Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 8:
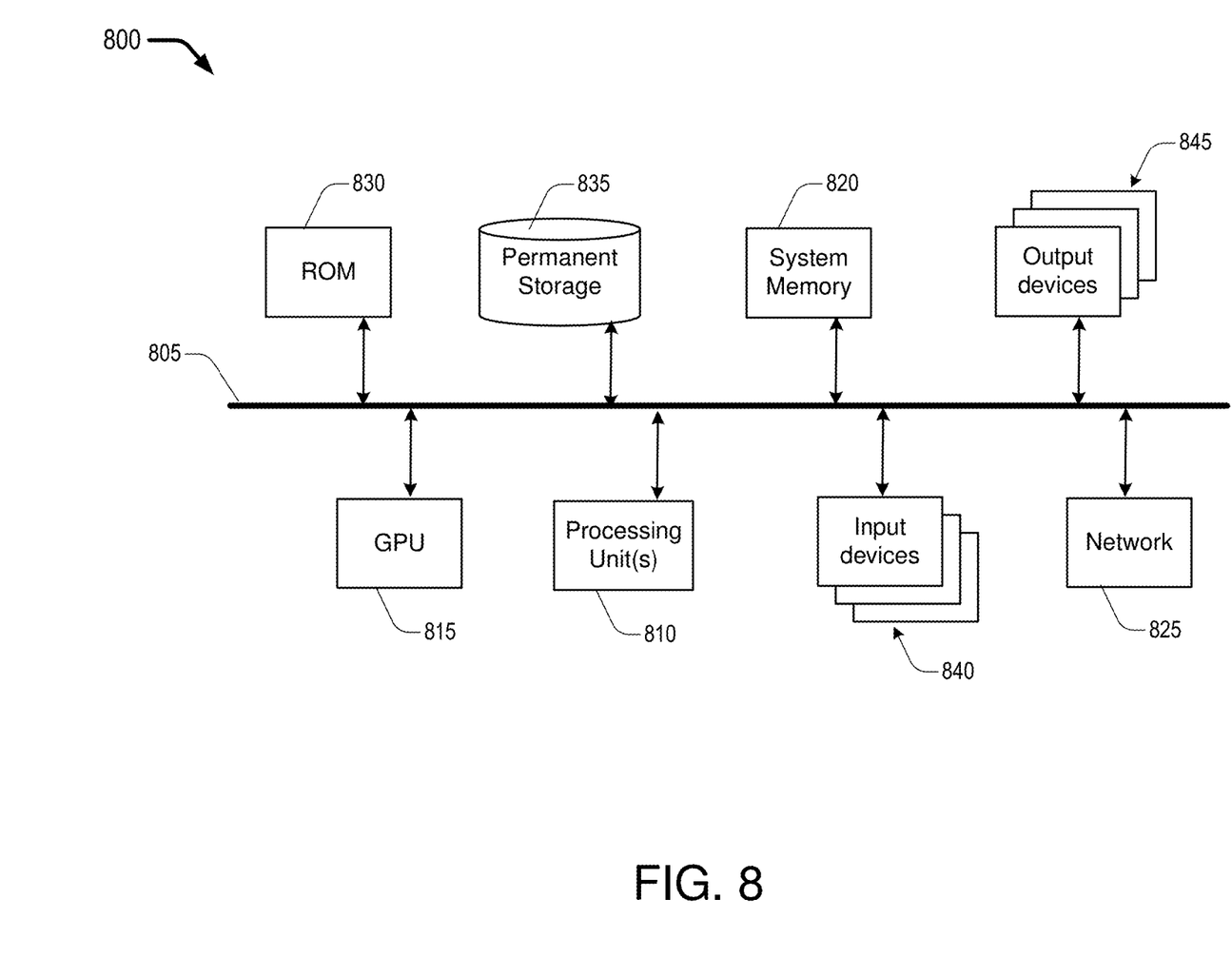
FIG. 8 is a diagram of an example electronic system in accordance with an implementation of the present disclosure.

FIG. 8 conceptually illustrates an electronic system 800 with which some embodiments of the present disclosure are implemented. The electronic system 800 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 800 includes a bus 805, processing unit(s) 810, a graphics-processing unit (GPU) 815, a system memory 820, a network 825, a read-only memory 830, a permanent storage device 835, input devices 840, and output devices 845.

The bus 805 collectively represents all system, peripheral, and chipset buses that communicatively connect the numerous internal devices of the electronic system 800. For instance, the bus 805 communicatively connects the processing unit(s) 810 with the GPU 815, the read-only memory 830, the system memory 820, and the permanent storage device 835.

From these various memory units, the processing unit(s) 810 retrieves instructions to execute and data to process in order to execute the processes of the present disclosure. The processing unit(s) may be a single processor or a multi-core processor in different embodiments. Some instructions are passed to and executed by the GPU 815. The GPU 815 can offload various computations or complement the image processing provided by the processing unit(s) 810.

The read-only-memory (ROM) 830 stores static data and instructions that are used by the processing unit(s) 810 and other modules of the electronic system. The permanent storage device 835, on the other hand, is a read-and-write memory device. This device is a non-volatile memory unit that stores instructions and data even when the electronic system 800 is off. Some embodiments of the present disclosure use a mass-storage device (such as a magnetic or optical disk and its corresponding disk drive) as the permanent storage device 835.

Other embodiments use a removable storage device (such as a floppy disk, flash memory device, etc., and its corresponding disk drive) as the permanent storage device. Like the permanent storage device 835, the system memory 820 is a read-and-write memory device. However, unlike storage device 835, the system memory 820 is a volatile read-and-write memory, such a random access memory. The system memory 820 stores some of the instructions and data that the processor uses at runtime. In some embodiments, processes in accordance with the present disclosure are stored in the system memory 820, the permanent storage device 835, and/or the read-only memory 830. For example, the various memory units include instructions for processing multimedia clips in accordance with some embodiments. From these various memory units, the processing unit(s) 810 retrieves instructions to execute and data to process in order to execute the processes of some embodiments.

The bus 805 also connects to the input and output devices 840 and 845. The input devices 840 enable the user to communicate information and select commands to the electronic system. The input devices 840 include alphanumeric keyboards and pointing devices (also called "cursor control devices"), cameras (e.g., webcams), microphones or similar devices for receiving voice commands, etc. The output devices 845 display images generated by the electronic system or otherwise output data. The output devices 845 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 8, bus 805 also couples electronic system 800 to a network 825 through a network adapter (not shown). In this manner, the computer can be a part of a network of computers (such as a local area network ("LAN"), a wide area network ("WAN"), or an Intranet, or a network of networks, such as the Internet. Any or all components of electronic system 800 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals. While the present disclosure has been described with reference to numerous specific details, one of ordinary skill in the art will recognize that the present disclosure can be embodied in other specific forms without departing from the spirit of the present disclosure.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to,"

the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   receiving, by a plurality of processing elements (PEs) each configured to perform coding efficiency evaluation for a respective coding tool, video data comprising a coding block (CB) divided into a plurality of sub-blocks, wherein:
   the plurality of PEs comprises a first number of PEs, and
   the receiving of the video data by the plurality of PEs comprises each of the plurality of PEs receiving the plurality of sub-blocks of the CB in batches, each batch comprising a second number of the plurality of sub-blocks, and the second number being equal to the first number;
   storing, by each of the plurality of PEs, the second number of the plurality of sub-blocks in a respective buffer accessible to the respective PE;
   calculating, by each of the plurality of PEs performing the coding efficiency evaluation, a respective figure of merit (FOM) specific to the respective coding tool and the video data;
   determining a coding tool specific to the video data by comparing the FOMs calculated by the plurality of PEs; and
   encoding the video data using the determined coding tool.

2. The method of claim 1, wherein no more than one of the plurality of PEs receives the video data at a time.

3. The method of claim 1, wherein:
   the plurality of sub-blocks forming an array of columns and rows.

4. The method of claim 3, wherein the receiving of the video data by the plurality of PEs comprises each of the plurality of PEs receiving the plurality of sub-blocks using a snake scan through the columns or the rows.

5. The method of claim 1, wherein each of the plurality of PEs has a pipeline structure comprising a plurality of stages, and wherein the calculating of the respective FOM comprises sequentially processing each of the second number of the plurality of sub-blocks through the plurality of stages.

6. The method of claim 1, wherein:
   the plurality of sub-blocks forming an array of columns and rows,
   the receiving of the video data comprises receiving the video data stored in a memory having a plurality of memory banks, the plurality of memory banks comprising a first group having a third number of memory banks of the plurality of memory banks and a second group having a fourth number of memory banks of the plurality of memory banks, and
   columns or rows of each pair of adjacent columns or rows of the array are respectively stored in the first group and the second group of the plurality of memory banks.

7. The method of claim 6, wherein:
   each of the third number and the fourth number is equal to the first number.

8. The method of claim 1, wherein each of the plurality of PEs is a low-complexity rate-distortion optimizer (LC-RDO), and wherein the FOM comprises a sum of squared differences (SSD), a sum of absolute differences (SAD), or a sum of absolute transformed differences (SATD).

9. The method of claim 1, further comprising:
   determining a set of coding parameters pertinent to the determined coding tool.

10. An apparatus, comprising:
    a cache memory having a plurality of memory banks;
    a processor configured to store video data in the cache memory according to a bank assignment scheme specific to the video data;
    a plurality of processing elements (PEs) each configured to calculate a respective figure of merit (FOM) specific to a respective coding tool and the video data; and
    a comparator configured to determine a coding tool specific to the video data by comparing the FOMs calculated by the plurality of PEs, wherein:
    the video data comprises a coding block (CB) divided into a plurality of sub-blocks,
    the plurality of PEs comprises a first number of PEs, each of the plurality of PEs accesses the cache memory to fetch the plurality of sub-blocks of the CB in batches, each batch comprising a second number of the plurality of sub-blocks, the second number being equal to the first number, and each of the plurality of PEs stores the second number of the plurality of sub-blocks in a respective buffer accessible to the respective PE.

11. The apparatus of claim 10, wherein no more than one of the plurality of PEs accesses the cache memory at a time.

12. The apparatus of claim 10, wherein:
the plurality of sub-blocks forming an array of columns and rows.

13. The apparatus of claim 12, wherein each of the plurality of PEs accesses the cache memory using a snake scan through the columns or the rows of the plurality of sub-blocks.

14. The apparatus of claim 11, wherein each of the plurality of PEs has a pipeline structure comprising a plurality of stages, and wherein each of the plurality of PEs is configured to calculate the respective FOM by sequentially processing each of the second number of the plurality of sub-blocks through the plurality of stages.

15. The apparatus of claim 10, wherein:
the plurality of sub-blocks forming an array of columns and rows,
the plurality of memory banks comprises a first group having a third number of memory banks of the plurality of memory banks and a second group having a fourth number of memory banks of the plurality of memory banks, and
columns or rows of each pair of adjacent columns or rows of the array are respectively stored in the first group and the second group of the plurality of memory banks.

16. The apparatus of claim 15, wherein:
each of the third number and the fourth number is equal to the first number.

17. The apparatus of claim 10, wherein each of the plurality of PEs is a low-complexity rate-distortion optimizer (LC-RDO), and wherein the FOM comprises a sum of squared differences (SSD), a sum of absolute differences (SAD), or a sum of absolute transformed differences (SATD).

18. The apparatus of claim 10, wherein the comparator further determines a set of coding parameters pertinent to the determined coding tool.

\* \* \* \* \*